US012312745B2

(12) United States Patent
Guidotti et al.

(10) Patent No.: US 12,312,745 B2
(45) Date of Patent: May 27, 2025

(54) METHOD FOR PRODUCING A CELLULOSE PRODUCT AND A CELLULOSE PRODUCT

(71) Applicant: PulPac AB, Västra Frölunda (SE)

(72) Inventors: Edward Guidotti, Gothenburg (SE); Mostafa Jabbari, Västra Frölunda (SE)

(73) Assignee: PULPAC AB, Västra Frölunda (SE)

( * ) Notice: Subject to any disclaimer, the term of this patent is extended or adjusted under 35 U.S.C. 154(b) by 400 days.

(21) Appl. No.: 17/623,820

(22) PCT Filed: Jun. 26, 2020

(86) PCT No.: PCT/EP2020/068039
§ 371 (c)(1),
(2) Date: Dec. 29, 2021

(87) PCT Pub. No.: WO2021/001276
PCT Pub. Date: Jan. 7, 2021

(65) Prior Publication Data

US 2022/0251785 A1 Aug. 11, 2022

(30) Foreign Application Priority Data

Jul. 2, 2019 (SE) .................................... 1950832-4

(51) Int. Cl.
*D21H 19/82* (2006.01)
*B31B 50/14* (2017.01)
(Continued)

(52) U.S. Cl.
CPC ......... *D21H 19/824* (2013.01); *B31B 50/142* (2017.08); *B31B 50/592* (2018.05);
(Continued)

(58) Field of Classification Search
CPC .... B27N 3/04; B27N 3/08; B27N 3/10; B30B 9/28; D04H 1/26; D04H 1/732;
(Continued)

(56) References Cited

U.S. PATENT DOCUMENTS

2015/0231867 A1* 8/2015 Kelly ....................... B32B 3/28
428/533

FOREIGN PATENT DOCUMENTS

EP 1160379 A2 12/2001
EP 1840043 A1 10/2007
(Continued)

OTHER PUBLICATIONS

International Search Report and Written Opinion for Application No. PCT/EP2020/068039, dated Sep. 4, 2020.
(Continued)

*Primary Examiner* — William P Fletcher, III
(74) *Attorney, Agent, or Firm* — MARSHALL, GERSTEIN & BORUN LLP

(57) ABSTRACT

A method for producing a cellulose product from an air-formed cellulose blank structure comprising the steps of: providing a cellulose blank structure which is air-formed from cellulose fibres; applying, in a first application step ($S_{A1}$), an alkyl ketene dimer (AKD) dispersion to the cellulose blank structure, and applying, in a second application step ($S_{A2}$) a latex dispersion to the cellulose blank structure arranging the cellulose blank structure with the applied alkyl ketene dimer (AKD) dispersion and latex dispersion in a forming mould; heating the cellulose blank structure to a forming temperature ($T_F$) in the range of 100° C. to 300° C., and forming the cellulose product from the cellulose blank structure in the forming mould, by pressing the heated cellulose blank structure with the applied alkyl ketene dimer (AKD) dispersion and latex dispersion with a forming pressure ($P_F$) of at least 1 MPa, preferably 4-20 MPa.

22 Claims, 2 Drawing Sheets

(51) Int. Cl.

| | |
|---|---|
| ***B31B 50/59*** | (2017.01) |
| ***B31B 120/00*** | (2017.01) |
| ***D04H 1/26*** | (2012.01) |
| ***D04H 1/425*** | (2012.01) |
| ***D04H 1/732*** | (2012.01) |
| ***D21H 19/16*** | (2006.01) |
| ***D21H 19/20*** | (2006.01) |
| ***D21H 21/16*** | (2006.01) |

(52) U.S. Cl.
CPC ............... *D04H 1/26* (2013.01); *D04H 1/425* (2013.01); *D04H 1/732* (2013.01); *D21H 19/16* (2013.01); *D21H 19/20* (2013.01); *D21H 21/16* (2013.01); *B31B 2120/00* (2017.08)

(58) Field of Classification Search
CPC .. D06B 1/02; D06B 1/08; B65B 43/08; B05D 1/02; B05D 1/36; B05D 1/38; B05D 7/10; B05D 7/50; B05D 2203/20; B05D 2203/22; B05D 2401/20; B05D 2518/00; B05D 2520/05; D06M 13/10; D06M 15/70; D06M 15/705
See application file for complete search history.

(56) References Cited

FOREIGN PATENT DOCUMENTS

| | | | |
|---|---|---|---|
| JP | 2003335319 | A | 11/2003 |
| SE | 1750313 | A1 * | 10/2018 |
| WO | WO-2014142714 | A1 | 9/2014 |

OTHER PUBLICATIONS

Office Action for Swedish patent application No. 1950832-4, dated Jan. 17, 2020.
International Preliminary Report on Patentability for Application No. PCT/EP2020/0680369, dated May 14, 2021 (Corrected Version).

* cited by examiner

METHOD FOR PRODUCING A CELLULOSE PRODUCT AND A CELLULOSE PRODUCT

TECHNICAL FIELD

The present disclosure relates to a method for producing a cellulose product with a barrier structure from an air-formed cellulose blank structure, where the cellulose blank structure is air-formed from cellulose fibres. The disclosure further relates to a cellulose product produced according to the method.

BACKGROUND

Cellulose fibres are often used as raw material for producing or manufacturing products. Products formed of cellulose fibres can be used in many different situations where there is a need for having sustainable products. A wide range of products can be produced from cellulose fibres and a few examples are disposable plates and cups, blank structures and packaging materials.

Forming moulds are commonly used when manufacturing cellulose products from raw materials including cellulose fibres, and traditionally the cellulose products have been produced with wet-forming technologies. A material commonly used for cellulose fibre products is wet moulded pulp. Wet moulded pulp has the advantage of being considered as a sustainable packaging material, since it is produced from biomaterials and can be recycled after use. Consequently, wet moulded pulp has been quickly increasing in popularity for different applications. Wet moulded pulp articles are generally formed by immersing a suction forming mould into a liquid or semi liquid pulp suspension or slurry comprising cellulose fibres, and when suction is applied, a body of pulp is formed with the shape of the desired product by fibre deposition onto the forming mould. With all wet-forming technologies, there is a need for drying of the wet moulded product, where the drying is a time and energy consuming part of the production. The demands on aesthetical, chemical and mechanical properties of cellulose products are increasing, and due to the properties of wet-formed cellulose products, the mechanical strength, flexibility, and chemical properties are limited. It is also difficult in wet-forming processes to control the mechanical properties of the cellulose products with high precision.

One development in the field of producing cellulose products is the forming of cellulose fibres without using wet-forming technologies, and instead the cellulose products are produced in a dry-forming process. In the dry-forming process, an air-formed cellulose blank structure is used. The air-formed cellulose blank structure is inserted into a forming mould and during the forming of the cellulose products the cellulose blank structure is subjected to a high forming pressure and a high forming temperature.

When using cellulose products made according to the dry-forming process, the cellulose products may be exposed to liquids, food or other substances that may affect the stiffness and rigidity of the cellulose products due to the tendency of the formed cellulose products to absorb for example water, moisture, or other substances. Plastic films that are laminated to the cellulose products may be used for preventing liquid from affecting the cellulose products. However, with the demand for more environmentally friendly products there is a desire to produce the cellulose products without plastic materials.

There is thus a need for an improved method for producing cellulose products from an air-formed cellulose blank structure, where the cellulose products can be produced to resist contact with liquids, food and other substances for longer time periods without affecting the mechanical properties of the cellulose products. There is further a demand for certain types of products to hold liquids or food, where no harmful substances are added to the cellulose products.

SUMMARY

An object of the present disclosure is to provide a method for producing a cellulose product and a cellulose product where the previously mentioned problems are avoided. This object is at least partly achieved by the features of the independent claims. The dependent claims contain further developments of the method for producing a cellulose product and the cellulose product.

The disclosure concerns a method for producing a cellulose product from an air-formed cellulose blank structure. The method comprises the steps; providing an air-formed cellulose blank structure, where the cellulose blank structure is air-formed from cellulose fibres; applying, in a first application step, an alkyl ketene dimer (AKD) dispersion to the cellulose blank structure, and applying, in a second application step following the first application step, a latex dispersion to the cellulose blank structure with the applied AKD dispersion; arranging the cellulose blank structure with the applied AKD dispersion and latex dispersion in a forming mould; heating the cellulose blank structure with the applied AKD dispersion and latex dispersion to a forming temperature in the range of 100° C. to 300° C., and forming the cellulose product from the cellulose blank structure with the applied AKD dispersion and latex dispersion in the forming mould, by pressing the heated cellulose blank structure with the applied AKD dispersion and latex dispersion with a forming pressure of at least 1 MPa, preferably 4-20 MPa.

Advantages with these features are that when forming the cellulose products, the AKD dispersion and the latex dispersion are forming a barrier structure that is preventing water from being absorbed in the cellulose fibre structure of the cellulose products. When exposing the cellulose products to liquids, food or other substances the formed barrier is preventing the substances from affecting the stiffness and rigidity of the cellulose products. The formed cellulose products are thus prevented from absorbing water, moisture or other substances. With the method, plastic materials can be avoided. The cellulose products can be produced to resist contact with liquids, food and other substances for longer periods without affecting the mechanical properties of the cellulose products. Further, no harmful substances are added to the cellulose products with the method.

According to an aspect of the disclosure, the AKD dispersion is in a wet state in the cellulose blank structure when applying the latex dispersion in the second application step to the cellulose blank structure with the applied AKD dispersion. When the AKD dispersion is in the wet state, and the latex dispersion is applied, an agglomerated structure based on the two dispersions is formed. The agglomerated structure is during the forming of the cellulose products in the forming mould forming the barrier preventing water from being absorbed in the formed cellulose products.

According to another aspect of the disclosure, the AKD dispersion is at least partly in a wet state and the latex dispersion is at least partly in a wet state in the cellulose blank structure prior to and/or during the heating and forming in the forming mould. Parts of the respective dispersions may be in the agglomerated state before arranging the cellulose blank structure in the forming mould. In the forming mould, the water from the respective dispersions is evaporating and the formation of agglomerated AKD and latex compounds are establishing an outer barrier structure on the formed cellulose products that efficiently is preventing water from being absorbed into the cellulose fibres of the cellulose products.

According to a further aspect of the disclosure, the second application step is following directly after the first application step. According to the disclosure, the latex dispersion is applied directly after the AKD dispersion, while the AKD dispersion is still in the wet state in order to form the desired agglomerated barrier structure. With this application method, the formation of the agglomerated barrier structure is efficiently achieved. The formation of the agglomerated structure is achieved when the dispersions in the wet states are applied to the cellulose blank structure, and where the AKD dispersion is applied in the first application step and the latex dispersion in the second application step. Desired results are achieved when the second application step is following directly after the first application step, where the AKD dispersion in the first application step has not dried before the application of the latex dispersion in the second application step.

According to an aspect of the disclosure, an amount of alkyl ketene dimer (AKD) compound in the range 0.5-20 $g/m^2$, preferably 0.5-15 $g/m^2$, more preferably 0.5-4 $g/m^2$, is applied to the cellulose blank structure. This amount of AKD compound is suitable to form the cellulose products with desired properties.

According to another aspect of the disclosure, an amount of latex compound in the range of 0.5-20 $g/m^2$, preferably 0.5-15 $g/m^2$, more preferably 0.5-4 $g/m^2$, is applied to the cellulose blank structure. This amount of latex compound is suitable to form the cellulose products with desired properties.

According to further aspects of the disclosure, the formed cellulose product has a water absorptiveness value measured according to the test method ISO 535:2014 ($Cobb_{600}$ value) in the range 0-60 $g/m^2$, preferably 0-40 $g/m^2$, more preferably 0-20 $g/m^2$, and/or a water absorptiveness value measured according to the test method ISO 535:2014 ($Cobb_{60}$ value) in the range 0-30 $g/m^2$, preferably 0-10 $g/m^2$, more preferably 0-5 $g/m^2$. With these ranges, the cellulose products can be used for holding liquids, food or other substances.

According to an aspect of the disclosure, the forming pressure is an isostatic forming pressure of at least 1 MPa, preferably 4-20 MPa. The isostatic forming pressure efficiently forms the cellulose products when they are having complex shapes.

According to other aspects of the disclosure, the AKD dispersion has a composition of 3-25% wt alkyl ketene dimer (AKD) wax; 0-4% wt modified starch stabilizer or polymeric stabilizer; and 75-97% wt water, and the latex dispersion has a composition of acrylate-based oligomer or polymer, wherein the acrylate-based oligomer or polymer is copolymerized or mixed with styrene and/or acrylonitrile; and 40-90% wt, preferably 60-90% wt, water. With these compositions, suitable dispersions for forming the barrier structure are achieved.

According to an aspect of the disclosure, before forming the cellulose product in the forming mould, the cellulose blank structure has a material composition of 98-99.98% dry wt cellulose fibres, 0.01-1% dry wt AKD compound, and 0.01-1% dry wt latex compound. This composition of the cellulose blank structure with the dispersions is suitable for forming the cellulose products with a barrier structure suitable for preventing water and other substances from being absorbed in the cellulose products.

According to another aspect of the disclosure, the combination of AKD dispersion in the first application step and latex dispersion in the second application step is applied on a first surface and/or a second surface of the cellulose blank structure. It is with the method thus possible to apply the dispersions on both sides of the cellulose blank structure or alternatively on one side of the cellulose blank structure, depending on the type of cellulose products produced.

The disclosure further concerns a cellulose product produced according to the method described above, and according to an aspect of the disclosure, the produced cellulose product has a water absorptiveness value measured according to the test method ISO 535:2014 ($Cobb_{600}$ value) in the range 0-60 $g/m^2$, preferably 0-40 $g/m^2$, more preferably 0-20 $g/m^2$, and/or a water absorptiveness value measured according to the test method ISO 535:2014 ($Cobb_{60}$ value) in the range 0-30 $g/m^2$, preferably 0-10 $g/m^2$, more preferably 0-5 $g/m^2$.

BRIEF DESCRIPTION OF DRAWINGS

The disclosure will be described in detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
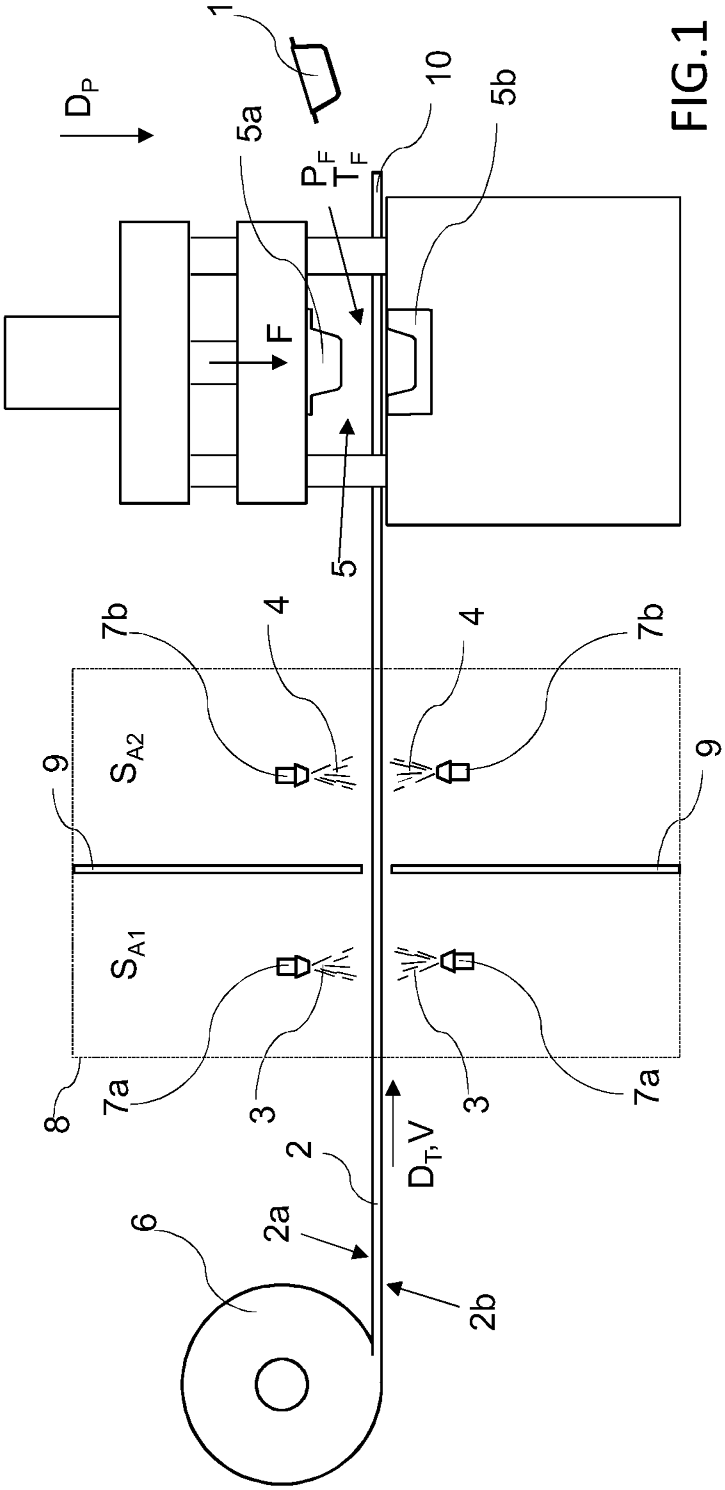
FIG. 1 shows schematically, a production line for producing cellulose products according to the disclosure.

FIG. 1 schematically illustrates a production line for producing a cellulose product 1 from an air-formed cellulose blank structure 2, where the cellulose blank structure 2 is air-formed from cellulose fibres. With a cellulose blank structure 2 is meant a fibre web structure produced from cellulose fibres. With air-forming of the cellulose blank structure 2 is meant the formation of a cellulose blank structure 2 in a dry-forming process in which cellulose fibres are air-formed to produce the cellulose blank structure 2. When forming the cellulose blank structure 2 in the air-forming process, the cellulose fibres are carried and formed to the fibre blank structure by air as carrying medium. This is different from a normal papermaking process or a traditional wet-forming process, where water is used as carrying medium for the cellulose fibres when forming the paper or fibre structure. In the air-forming process, small amounts of water or other substances may if desired be added to the cellulose fibres in order to change the properties of the cellulose product, but air is still used as carrying medium in the forming process. The cellulose blank structure 2 may have a dryness that is mainly corresponding to the ambient humidity in the atmosphere surrounding the dry-formed cellulose blank structure 2.

The cellulose blank structure 2 may be formed of cellulose fibres in a conventional dry-forming process and be configured in different ways. For example, the cellulose blank structure 2 may have a composition where the fibres are of the same origin or alternatively contain a mix of two or more types of cellulose fibres, depending on the desired properties of the cellulose products 1. The cellulose fibres used in the cellulose blank structure 2 are during the forming of the cellulose products 1 strongly bonded to each other with hydrogen bonds. The cellulose fibres may be mixed with other substances or compounds to a certain amount if desired. With cellulose fibres is meant any type of cellulose fibres, such as natural cellulose fibres or manufactured cellulose fibres.

The cellulose blank structure 2 may have a single-layer or a multi-layer structure. A cellulose blank structure 2 having a single-layer structure is referring to a cellulose blank structure that is formed of one layer containing cellulose fibres. A cellulose blank structure 2 having a multi-layer structure is referring to a cellulose blank structure that is formed of two or more layers containing cellulose fibres, where the layers may have the same or different compositions or configurations.

According to the disclosure, the method comprises the step; providing the air-formed cellulose blank structure 2, where the cellulose blank structure 2 is air-formed from cellulose fibres. The air-forming of the cellulose blank structure 2 may take place as a separate process or method step, in which the cellulose blank structure 2 may be pre-formed and stacked in sheets or arranged in rolls as a rolled web, before the forming of the cellulose products 1. In the embodiments illustrated in FIGS. 1 and 2, the cellulose blank structure 2 has been pre-formed in an air-forming process from cellulose fibres and arranged in rolls 6. As an alternative, the air-forming of the cellulose blank structure 2 may be part of a continuous process where the cellulose blanks structure 2 is transported for further forming into the cellulose products directly after the air-forming step.

Figure 2:
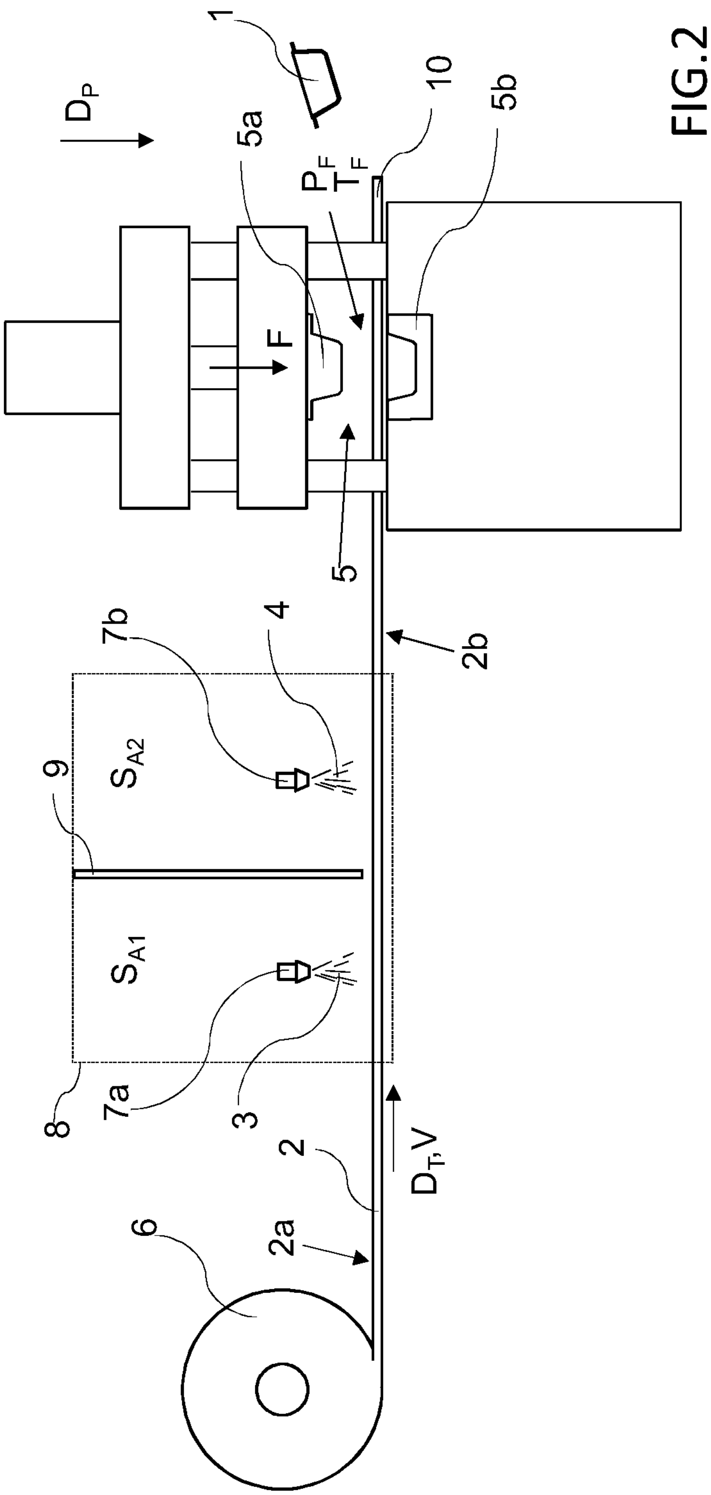
FIG. 2 shows schematically, a production line for producing cellulose products according to another embodiment of the disclosure.

In the method illustrated in FIGS. 1 and 2, the cellulose blank structure 2 is transported to a forming mould 5 for forming of the cellulose products 1 from the cellulose blank structure 2. The forming mould 5 is part of a forming mould system, where the forming mould 5 in the illustrated embodiments comprises a first mould part 5*a*, a second mould part 5*b*, and a forming cavity. The forming cavity is formed between the first mould part 5*a* and the second mould part 5*b* during a forming operation in which the cellulose blank structure 2 is formed into the cellulose products 1. The cellulose blank structure 2 is transported in a transportation direction $D_T$ with a suitable transportation speed V, as indicated in FIGS. 1 and 2. The forming mould 5 may be of any suitable design and construction.

In order to form the cellulose products 1, the cellulose blank structure 2 is arranged in the forming mould 5, where the cellulose blank structure 2 is heated to a specific forming temperature $T_F$ and pressed with a specific forming pressure $P_F$ between the mould parts in the forming cavity of the forming mould 5. When forming the cellulose products 1, a force F is applied to the first forming mould part 5*a* and/or the second forming mould part 5*b*, as illustrated in the figures. The applied force F is during the forming process establishing the forming pressure $P_F$ in the forming cavity. According to the disclosure, when forming the cellulose products 1 from the cellulose blank structure 2 in the forming mould 5, a forming pressure $P_F$ of at least 1 MPa, preferably in the range 4-20 MPa, and a forming temperature $T_F$ in the range of 100° C. to 300° C. are applied to the cellulose blank structure 2. The cellulose fibres in the cellulose blank structure 2 are in the forming process bonded to each other in a way where the resulting cellulose products 1 are having good mechanical properties. The forming mould parts may suitably be made of a stiff material, such as for example steel, aluminium, or other suitable metals. The forming pressure $P_F$ may be isostatic or non-isostatic depending on the types of cellulose products 1 produced or on the forming moulds 5 used.

The forming temperature $T_F$ of the cellulose blank structure 2 may for example be measured with suitable temperature sensors when the cellulose blank structure 2 is formed between the mould parts, such as for example temperature sensors integrated in the mould parts, or thermochromic temperature sensors arranged in connection to or in the cellulose blank structure 2. Other suitable sensors may for example be IR sensors measuring the temperature of the cellulose blank structure 2 directly after forming between the mould parts.

Tests have shown that higher forming temperatures will give stronger bonding between the cellulose fibres when being pressed at a specific forming pressure. With forming temperatures $T_F$ above 100° C. together with a forming pressure $P_F$ of at least 1 MPa, the cellulose fibres will be strongly bonded to each other with hydrogen bonds. A higher forming temperature $T_F$ will increase the fibril aggregation, water resistance, Young's modulus and the mechanical properties of the final cellulose product. The high pressure is important for fibril aggregation between the cellulose fibres in the cellulose products 1. At temperatures higher than 300° C., the cellulose fibres will be thermally degraded and therefore temperatures above 300° C. should be avoided. The forming pressure $P_F$ and the forming temperature $T_F$ may be chosen to be suitable for the specific cellulose products 1 to be produced.

The cellulose products 1 may as a non-limiting example be formed in the forming mould 5 during a forming time period in a range of 0.001 to 20 seconds. As an alternative, the forming time period may be in a range of 0.01 to 15.0 seconds or in a range of 0.1 to 10.0 seconds. The time period is chosen so that the desired properties of the cellulose products 1 are achieved. Longer forming time periods can be needed if the cellulose blank structure 2 is heated in the forming mould 5, compared to a pre-heated cellulose blank structure 2.

The heating of the cellulose blank structure 2 may take place before the pressing in the forming mould 5 or at least partly before the pressing in the forming mould 5. As an alternative, the heating of the cellulose blank structure 2 may take place in the forming mould 5 when being pressed. The heating of the cellulose blank structure 2 may for example be accomplished through heating the forming mould 5. The forming pressure may also be applied before heating the cellulose blank structure 2, and for example, the heating of the cellulose blank structure 2 may take place in the forming mould 5 during pressing.

The cellulose blank structure 2 may be arranged into the forming mould 5 in any suitable way, and as an example, the cellulose blank structure 2 may be manually arranged in the forming mould 5. Another alternative is to arrange a feeding device for the cellulose blank structure 2, which is transporting the cellulose blank structure 2 to the forming mould 5 in the transportation direction $D_T$ with the transportation speed V. The feeding device could for example be a conveyor belt, a forming wire unit, an industrial robot, or any other suitable manufacturing equipment. The transportation speed V may differ depending on the types of cellulose products 1 produced, and is chosen to match the forming speed in the forming mould 5.

In the illustrated embodiments, the first mould part 5*a* and the second mould part 5*b* are movably arranged in relation to each other in a pressing direction $D_P$ and further arranged to be pressed in relation towards each other during forming of the cellulose products 2 with the force F. The force F may vary during the forming process and depend on the type of cellulose products 1 formed and the forming equipment used. When forming the cellulose products 1, the cellulose blank structure 2 is arranged in the forming mould 5 when the forming mould 5 is in an open state between the first mould part 5*a* and the second mould part 5*b*. The forming cavity may be arranged with a shape that is corresponding to the final shape of the cellulose products 1. The cellulose blank structure 2 may be arranged in the forming mould 5 to fully or partly cover the forming cavity 6. When the cellulose blank structure 2 has been arranged in the forming mould 5, the first mould part 5*a* and the second mould part 5*b* are moved in relation to and towards each other during the forming process. When a suitable forming pressure $P_F$, or a suitable distance between the mould parts is achieved, the movement of the mould parts is stopped. The mould parts are thereafter moved in a direction away from each other after a certain time period or directly after the mould parts have stopped.

The forming mould system can for example be constructed so that the first mould part 5*a* or the second mould part 5*b* is movable and arranged to move towards the other mould part during the forming process, where the other mould part is stationary or non-movably arranged. In an alternative solution, both the first mould part 5*a* and the second mould part 5*b* are movably arranged, where the first mould part 5*a* and the second mould part 5*b* are displaced in directions towards each other during the forming process. The moving mould part or alternatively moving mould parts may be displaced with a suitable actuator, such as a hydraulic, pneumatic, or electric actuator. A combination of different actuators may also be used. The relative speed between the first mould part 5*a* and the second mould part 5*b* during the forming process is chosen so that the cellulose blank structure 2 is evenly distributed in the forming cavity during the forming process. The actuator or actuators used for moving the first mould part 5*a*, or alternatively the second mould part 5*b*, or both mould parts may for example be pressure controlled, wherein the relative movement of the first mould part 5*a* in relation to the second mould part 5*b* is stopped when the correct forming pressure is established in the forming mould. The first mould part 5*a* and the second mould part 5*b* may be arranged in a suitable stand, frame, or similar structure to hold the mould parts, and an actuator arrangement may be used for moving the first mould part 5*a* and/or the second mould part 5*b*.

It should be understood that the forming mould 5 may have other designs and constructions compared to the ones described above, such as for example a rotary forming mould construction. The forming mould 5 may also for example be arranged with a cutting device, where the cellulose blank structure 2 is cut into a desired shape in the forming mould 5 during the forming process. When the cellulose products 1 have been cut from the cellulose blank structure 2 after the forming process, a remaining residual cellulose fibre structure 10 is formed. The residual cellulose fibre structure 10 may be recycled and used again when air-forming new cellulose blank structures 2. The residual cellulose fibre structure 10 may be collected with a suitable collection device, such as for example a suction arrangement with transportation pipes for collecting and transporting the residual cellulose fibre structure 10 to a desired location.

The cellulose blank structure 2 may comprise one or more additives that are altering the mechanical, hydrophobic, and/or oleophobic properties of the cellulose products 1. In order to achieve the desired properties of the formed cellulose products 1, the cellulose fibres should be strongly bonded to each other through fibril aggregation in a way so that the resulting cellulose products 1 will have good mechanical properties. The additives used may therefore not impact the bonding of the cellulose fibres during the forming process to a high extent.

One preferred property of the cellulose products 1 is the ability to hold or withstand liquids, such as for example when the cellulose products are used in contact with beverages, food, and other water-containing substances. An additive used when producing cellulose products in traditional wet-forming processes is for example alkyl ketene dimer (AKD).

Tests have shown that unique product properties may be achieved with a combination of AKD and latex added to the dry-formed cellulose blank structure 2 when forming the cellulose products 1 under specific conditions and with specific process parameters. Relevant process parameters are a high forming pressure $P_F$ and a high forming temperature $T_F$. When using the combination of AKD and latex, a high level of hydrophobicity can be achieved, resulting in cellulose products 1 with a high ability to withstand liquids, such as water, without negatively affecting the mechanical properties of the cellulose products 1.

According to the disclosure, as illustrated in FIG. 1, an alkyl ketene dimer (AKD) dispersion 3 is applied to the cellulose blank structure 2 in a first application step $S_{A1}$, and in a second application step $S_{A2}$ following the first application step $S_{A1}$, a latex dispersion 4 is applied to the cellulose blank structure 2 with the applied AKD dispersion 3. The first application step $S_{A1}$, and the second application step $S_{A2}$, are used for distributing the AKD dispersion 3 and the latex dispersion 4 onto the surface or surfaces of the cellulose blank structure 2.

The AKD dispersion 3 is applied in the first application step $S_{A1}$ and the latex dispersion 4 is applied in the second application step $S_{A2}$ following the first application step $S_{A1}$ on a first surface 2*a* and/or a second surface 2*b* of the cellulose blank structure 2. In this way, the combination of AKD dispersion 3 in the first application step $S_{A1}$ and latex dispersion 4 in the second application step $S_{A2}$ is applied on the first surface 2*a* and/or the second surface 2*b*, as will be further described below.

In the embodiment illustrated in FIG. 1, the AKD dispersion 3 and the latex dispersion 4 are applied to both an upper first surface 2*a* on the first side of the cellulose blank structure 2 and a lower second surface 2*b* on the second side of the cellulose blank structure 2. A set of first spray nozzles 7*a* may be arranged for applying the AKD dispersion 3 from above the cellulose blank structure 2 onto the first surface 2*a* and from below the cellulose blank structure 2 onto the second surface 2*b*. One or more first spray nozzles 7*a* may be used for applying the AKD dispersion 3 onto the first surface 2*a* and one or more first spray nozzles 7*a* may be used for applying the AKD dispersion 3 onto the second surface 2*b*. A set of second spray nozzles 7*b* may be used for applying the latex dispersion 4 from above the cellulose blank structure 2 onto the first surface 2*a* and from below the cellulose blank structure 2 onto the second surface 2*b*. One or more second spray nozzles 7*b* may be used for applying the latex dispersion 4 onto the first surface 2*a* and one or more second spray nozzles 7*b* may be used for applying the latex dispersion 4 onto the second surface 2*b*. In this way, the latex dispersion 4 is applied directly onto or on top of the AKD dispersion 3 already applied onto the cellulose blank structure 2 during the application phase, suitably in a wet-on-wet application process as further described below. The latex dispersion 4 is thus applied on the same surfaces of the cellulose blank structure 2 as the AKD dispersion 3. The spray nozzles used may be of any suitable construction for distributing the respective dispersions under hydraulic or pneumatic pressure, such as for example spray nozzles for hydraulic spraying which do not employ compressed air. The arrangement of spray nozzles may differ from the ones described and illustrated, depending on the configuration, shape, and size of the cellulose blank structure 2. Other suitable application methods and equipment may also be used instead of, or in combination with, spraying and the use of spray nozzles. Other application technologies may for example include application of the AKD dispersion 3 with a tissue carrier in direct contact with the first surface 2*a* and/or the second surface 2*b* of the cellulose blank structure 2; slot coating for the application of the AKD dispersion 3 and/or the latex dispersion 4; and/or screen-printing for the application of the AKD dispersion 3 and/or the latex dispersion 4.

In an alternative embodiment, the AKD dispersion 3 is applied in the first application step $S_{A1}$ and the latex dispersion 4 is applied in the second application step $S_{A2}$ on only the first surface 2*a* on the first side of the cellulose blank structure 2 or the second surface 2*b* on the second side of the cellulose blank structure 2. In the embodiment illustrated in FIG. 1, the AKD dispersion 3 and the latex dispersion 4 are applied to the upper first surface 2*a* of the cellulose blank structure 2. One or more first spray nozzles 7*a* may be arranged for applying the AKD dispersion 3 from above the cellulose blank structure 2 onto the first surface 2*a*, and one or more of second spray nozzles 7*b* may be used for applying the latex dispersion 4 from above the cellulose blank structure 2 onto the first surface 2*a*. In this way, the latex dispersion 4 is applied directly onto or on top of the AKD dispersion 3 already applied onto the cellulose blank structure 2 during the application phase, suitably in a wet-on-wet application process as further described below. The latex dispersion 4 is thus applied on the same surface of the cellulose blank structure 2 as the AKD dispersion 3. Also in this embodiment, the spray nozzles used may be of any suitable construction for distributing the respective dispersions under hydraulic or pneumatic pressure, such as for example spray nozzles for hydraulic spraying which do not employ compressed air. Other suitable application methods and equipment may also be used instead of, or in combination with, spraying and the use of spray nozzles. Other application technologies may for example include application of the AKD dispersion 3 with a tissue carrier in direct contact with the first surface 2*a* or the second surface 2*b* of the cellulose blank structure 2; slot coating for the application of the AKD dispersion 3 and/or the latex dispersion 4; and/or screen-printing for the application of the AKD dispersion 3 and/or the latex dispersion 4.

The spray nozzles in the different embodiments may spray the respective dispersions continuously or intermittently onto the cellulose blank structure 2. The dispersions may also be applied over the whole cellulose blank structure or only on parts or zones of the cellulose blank structure 2. The spray nozzles may suitably be arranged in a spray booth 8 or similar structure, as schematically indicated in the figures. The spray booth 8 may prevent that the respective dispersions when sprayed are spread into the surrounding environment. One or more separation walls 9 may be arranged for separating the area where the AKD dispersion 3 is applied to the cellulose blank structure 2 and the area where the latex dispersion 4 is applied to the cellulose blank structure 2, as shown in the figures. The one or more separation walls 9 may be part of the structure forming the spray booth 8 or arranged as separate wall structures. In the embodiment illustrated in FIG. 1, separation walls 9 are arranged on both sides of the cellulose blank structure 2, and in the embodiment illustrated in FIG. 2, a separation wall is arranged on the upper side of the cellulose blank structure 2. The separation walls 9 may be made of any suitable material and are preventing that the respective dispersions are mixed during the application onto the cellulose blank structure 2 with the spray nozzles. A mixing of the dispersions may result in unwanted agglomeration of AKD and latex in the air before the application of the respective dispersions onto the cellulose blank structure 2.

The cellulose blank structure 2 with the applied AKD dispersion 3 and latex dispersion 4 is arranged in the forming mould 5. The cellulose blank structure 2 with the applied AKD dispersion 3 and latex dispersion 4 is heated to a forming temperature $T_F$ in the range of 100° C. to 300° C., and the cellulose product 1 is formed from the cellulose blank structure 2 with the applied AKD dispersion 3 and latex dispersion 4 in the forming mould 5, by pressing the heated cellulose blank structure 2 with the applied AKD dispersion 3 and latex dispersion 4 with a forming pressure $P_F$ of at least 1 MPa, preferably 4-20 MPa. The cellulose products 1 may after forming in the forming mould 5 be cured in a curing oven or other suitable thermal processing device, such as for example infrared heating lamps or an ultra violet light source, if desired. Further additives may also be applied on the formed cellulose products 1 if suitable.

The AKD dispersion comprises an alkyl ketene dimer (AKD) compound and water, where the AKD compound comprises an alkyl ketene dimer (AKD) wax and stabilizing agents. The AKD compound may have a composition comprising the AKD wax, and modified starch stabilizer or polymeric stabilizer as stabilizing agents. According to the disclosure, the AKD dispersion 3 may suitably have a composition of 3-25% wt alkyl ketene dimer (AKD) wax; 0-4% wt modified starch stabilizer or polymeric stabilizer; and 75-97% wt water. With this composition, an AKD dispersion 3 with suitable properties is achieved.

The latex dispersion 4 comprises a latex compound and water. The latex compound may have a composition comprising an acrylate-based oligomer or polymer, where the acrylate-based oligomer or polymer suitably is copolymerized or mixed with styrene and/or acrylonitrile. According to the disclosure, the latex dispersion 4 may suitably have a composition of acrylate-based oligomer or polymer, wherein the acrylate-based oligomer or polymer suitably is copolymerized or mixed with styrene and/or acrylonitrile; and 40-90% wt, preferably 60-90% wt, water. With this composition, a latex dispersion 4 with suitable properties is achieved. Thus, if desired, it is possible to produce the latex dispersion 4 styrene-free or acrylonitrile-free.

The AKD dispersion 3 and the latex dispersion 4, as described above, are together when applied to the cellulose blank structure 2 providing desired properties when forming the cellulose products 1 in the forming mould 5. Before forming the cellulose product 1 in the forming mould 5, the cellulose blank structure 2 suitably has a material composition of 98-99.98% dry wt cellulose fibres, 0.01-1% dry wt AKD compound, and 0.01-1% dry wt latex compound.

To achieve the desired properties of the cellulose products, the AKD dispersion 3 comprising the specific amount of 75-97% wt water is applied in the first application step $S_{A1}$ to the cellulose blank structure 2 in a wet state, and the latex dispersion 4 comprising the specific amount of 40-90% wt, preferably 60-90% wt, water is thereafter applied in the second application step $S_{A2}$ to the cellulose blank structure 2 in a wet state. According to the disclosure, the AKD dispersion 3 is in a wet state in the cellulose blank structure 2 when applying the latex dispersion 4 in the second application step $S_{A2}$ to the cellulose blank structure 2 with the applied AKD dispersion 3. The AKD dispersion 3 is thus still in the wet state when the latex dispersion 4 is applied, and in this way the dispersions are applied through the wet-on-wet application process for desired results. The latex dispersion 4 may be applied in the wet state directly onto or on top of the AKD dispersion 3 already applied in the wet state onto the cellulose blank structure 2. When the latex dispersion 4 comes into contact with the applied AKD dispersion 3, the particles dispersed in the respective dispersions are in the wet state forming an agglomerated structure, which agglomerated structure is providing the desired properties of the cellulose products 1. When the latex dispersion 4 is sprayed onto the cellulose blank structure 2 with the applied AKD dispersion 3 in the second application step $S_{A2}$, a thin layer of the agglomerated structure is formed onto the surface of the cellulose blank structure 2 when the latex dispersion 4 meets the AKD dispersion 3. The agglomerated thin layer provides a temporary barrier towards the liquid in the applied latex dispersion 4 preventing the latex dispersion 4 from being absorbed by the cellulose fibres of the cellulose blank structure 2. The formation of the agglomerated structure is achieved when the dispersions in the wet states are applied to the cellulose blank structure 2, and where the AKD dispersion is applied in the first application step $S_{A1}$ and the latex dispersion 4 in the second application step $S_{A2}$. Tests have shown that good results are achieved when the second application step $S_{A2}$ is following directly after the first application step $S_{A1}$, where the AKD dispersion in the first application step $S_{A1}$ has not dried before the application of the latex dispersion in the second application step $S_{A2}$.

To achieve the desired results, the AKD dispersion 3 is at least partly in a wet state and the latex dispersion 4 is at least partly is in a wet state in the cellulose blank structure 2 prior to and/or during the heating and forming in the forming mould 5. Parts of the respective dispersions may be in the agglomerated state before arranging the cellulose blank structure 2 in the forming mould 5. During heating and pressing the cellulose blank structure 2 in the forming mould 5, the water from the respective dispersions is evaporating and the formation of agglomerated AKD and latex compounds are establishing an outer barrier structure on the formed cellulose products 1 that efficiently is preventing water from being absorbed into the cellulose fibres of the cellulose products 1.

Tests have shown that desired properties are achieved when an amount of AKD compound in the range of 0.5-20 g/$m^2$, preferably 0.5-15 g/$m^2$, more preferably 0.5-4 g/$m^2$, is applied to the cellulose blank structure 2, and an amount of latex compound in the range of 0.5-20 g/$m^2$, preferably 0.5-15 g/$m^2$, more preferably 0.5-4 g/$m^2$, is applied to the cellulose blank structure 2. The AKD and latex compounds are as described above forming an outer barrier structure, and the agglomerated structure is not interfering with the bonding between the cellulose fibres with hydrogen bonds within the inner parts of the cellulose blank structure 2 during the forming of the cellulose products 1.

Tests have shown that with the method described, the formed cellulose product 1 may have a water absorptiveness value ($Cobb_{600}$ value) in the range 0-60 g/$m^2$, preferably 0-40 g/$m^2$, more preferably 0-20 g/$m^2$, and/or a water absorptiveness value ($Cobb_{60}$ value) in the range 0-30 g/$m^2$, preferably 0-10 g/$m^2$, more preferably 0-5 g/$m^2$. The $Cobb_{600}$ value is measured according to the test method ISO 535:2014, and the tests are according to the test method based on 600-second intervals. The $Cobb_{60}$ value is measured according to the test method ISO 535:2014, and the tests are according to the test method based on 60-second intervals. With these water absorptiveness value ranges, the cellulose products 1 are highly suitable for holding liquids, food or other substances, that otherwise may affect the properties of the cellulose products 1. The barrier structure formed by the AKD and latex compounds are efficiently preventing water from being absorbed into the fibre structure of the cellulose products 1.

In a further alternative embodiment not illustrated in the figures, the AKD dispersion 3 is applied to the first surface 2_a_ or the second surface 2_b_ of the cellulose blank structure 2, and the latex dispersion 4 to the other surface. This may be a suitable way of applying the AKD dispersion 3 and the latex dispersion 4 if thinner cellulose blank structures are used. The formation of the agglomerated structure is then taking place within the cellulose blank structure 2 instead of on the surface or surfaces of the cellulose blank structure 2.

The embodiments described above may be altered if needed. If the combination of AKD dispersion 3 in the first application step and latex dispersion 4 in the second application step is applied only to the first surface 2_a_ or the second surface 2_b_, as described above, AKD dispersion, latex dispersion or a different additive may be applied to the other of the first surface 2_a_ and the second surface 2_b_, or on top of the combination of AKD dispersion and latex dispersion. If the combination of AKD dispersion 3 in the first application step and latex dispersion 4 in the second application step is applied both to the first surface 2_a_ and the second surface 2_b_, as described above, AKD dispersion, latex dispersion or a different additive may be applied on top of the combination of AKD dispersion and latex dispersion on the first surface 2_a_ and/or the second surface 2_b_. If the AKD dispersion 3 is applied to the first surface 2_a_ or the second surface 2_b_ of the cellulose blank structure 2, and the latex dispersion 4 to the other surface, as described above, AKD dispersion, latex dispersion or a different additive may be applied to the first surface 2_a_ and/or the second surface 2_b_.

The forming mould system may further comprise at least one deformation element arranged in the forming cavity and attached to the first mould part 5_a_ and/or the second mould part 5_b_, where the deformation element during forming of the cellulose products 1 is arranged to exert a forming pressure $P_F$ on the cellulose blank structure 2. During the forming, the deformation element is deformed to exert a pressure on the cellulose blank structure 2 and through the deformation an even pressure distribution is achieved in the forming mould 5.

The deformation element is during forming of the cellulose products 1 arranged to exert a forming pressure $P_F$ on the cellulose blank structure 2. To exert a required forming pressure $P_F$ on the cellulose blank structure 2, the deformation element is made of a material that can be deformed when a force or pressure is applied. For example, the deformation element is suitably made of an elastic material capable of recovering size and shape after deformation. The deformation element is further suitably made of a material that is withstanding the high forming pressure and temperature levels used when forming the cellulose products 1 in the forming mould 5.

During the forming process, the deformation element is deformed to exert the forming pressure $P_F$ on the cellulose blank structure 2. Through the deformation an even pressure distribution can be achieved in the forming mould 5, even if the cellulose products 1 are having complex three-dimensional shapes with cutouts, apertures and holes, or if the cellulose blank structures 2 used are having varying densities, thicknesses, or grammage levels.

Certain elastic or deformable materials have fluid-like properties when being exposed to high pressure levels. If the deformation element is made of such a material, an even pressure distribution in the forming mould 5 can be achieved in the forming process, where the pressure exerted on the cellulose blank structure 2 from the deformation element is equal or essentially equal in all directions in the forming mould 5. When the deformation element during pressure is in its fluid-like state, a uniform fluid-like pressure distribution is achieved in the forming mould 5. The forming pressure is with such a material thus applied to the cellulose blank structure 2 from all directions, and the deformation element is in this way during the forming of the cellulose products 1 exerting an isostatic forming pressure $P_F$ on the cellulose blank structure 2. The isostatic forming pressure $P_F$ is establishing a uniform pressure in all directions in the forming mould 5 on the cellulose blank structure 2. The isostatic forming pressure $P_F$ is providing an efficient forming process of the cellulose products 1 in the forming mould 5, and the cellulose products 1 can be produced with high quality even if having complex shapes. According to the disclosure, a suitable isostatic forming pressure $P_F$ when forming the cellulose products 2 is at least 1 MPa, preferably in the range 4-20 MPa.

The deformation element may be made of a suitable structure of elastomeric material, where the material has the ability to establish a uniform pressure on the cellulose blank structure 2 in the forming mould 5 during the forming process. As an example, the deformation element is made of a massive structure or an essentially massive structure of silicone rubber, polyurethane, polychloroprene, or rubber with a hardness in the range 20-90 Shore A. Other materials for the deformation element may for example be suitable gel materials, liquid crystal elastomers, and MR fluids.

In the different embodiments described above, the deformation element may be releasably attached to the first mould part 5*a* or the second mould part 5*b*. The deformation element is shaped into a shape suitable for the forming mould 5, wherein the deformation element during the forming of the cellulose product 1 is enabling an efficient pressure distribution on the cellulose blank structure 2.

In an alternative embodiment, the deformation element instead comprises a flexible membrane and a pressure media. With this construction, the deformation element during the forming of the cellulose product 1 is enabling an efficient pressure distribution on the cellulose blank structure 2. The deformation element may for example be arranged in connection to the first mould part 5*a* and the pressure media may for example be hydraulic oil exerting a pressure on the flexible membrane during the forming of the cellulose products 1. An outer part of the flexible membrane may for example be attached to a lower surface of the first mould part 5*a*, wherein a sealed volume is formed between the flexible membrane, and the lower surface. The pressure media may be arranged to flow into and out from the sealed volume through a flow channel arranged in the first mould part 5*a*. Through the pressure media, the deformation element is exerting a forming pressure on the cellulose blank. During the forming process, the pressure media is allowed to flow into the sealed volume. In this way, the flexible membrane is exerting the forming pressure on the cellulose blank structure 2 arranged in the forming cavity of the forming mould 5 when being deformed. As described above, a suitable forming pressure $P_F$ when forming the cellulose products 1 is at least 1 MPa, preferably in the range 4-20 MPa. By applying a suitable pressure on the cellulose blank structure 2 with the flexible membrane, the cellulose fibres in the cellulose blank structure 2 are compressed in the forming mould 5. The applied pressure on the cellulose blank structure 2 from the pressure media and the flexible membrane may be isostatic in order to compress the cellulose fibres evenly regardless of their relative position on the forming mould 5 and regardless of the actual local amount of fibres. The pressure media used in the forming process may be any suitable fluid, such as for example hydraulic oil, water and air.

It should be understood that both isostatic forming and non-isostatic forming may be achieved in the forming mould 5, depending on the design and construction of the forming mould 5. A deformation element may also be used for non-isostatic forming in the forming mould 5, for example when using a deformation element in combination with stiff mould parts.

The forming mould system may further comprise a heating device arranged in connection to the first mould part 5*a* and/or the second mould part 5*b*. During forming of the cellulose products 1 the first mould part 5*a* and/or the second mould part 5*b* may be heated to a forming mould temperature in the range 100-500° C. to establish the forming temperature $T_F$ in the range of 100° C. to 300° C. that needs to be applied to the cellulose blank structure 2. The heating device may be integrated in the first mould part 5*a* and/or the second mould part 5*b*, and suitable heating devices 10 are e.g. an electrical heater or a fluid heater. Other suitable heat sources may also be used.

The forming mould system may further comprise a pressing unit arranged to apply a pressure on the first mould part 5*a* and/or the second mould part 5*b*. The pressing unit may also be used for displacing the first mould part 5*a* and/or the second mould part 5*b*. The moving mould part or alternatively moving mould parts may be displaced with a suitable pressing actuator, such as a hydraulic, pneumatic, or electric actuator.

It should be understood that the disclosure is not limited to only applying the two additives described in the different embodiments above. After the application of the AKD dispersion 3 in the first application step $S_{A1}$ and the latex dispersion 4 in the second application step $S_{A2}$ following the first application step $S_{A1}$, further additives may be added to the cellulose blank structure 2 in one or more subsequent application steps before the forming of the cellulose products 1 in the forming mould 5.

As an example, an additional layer of a second latex dispersion may be applied to the cellulose blank structure 2 in a third application step following the second application step $S_{A2}$. The latex dispersion 4 applied in the second application step $S_{A2}$ is thus a first latex dispersion applied to the cellulose blank structure 2. The second latex dispersion applied in the third application step may have the same composition as the latex dispersion 4 applied in the second application step $S_{A2}$, or alternatively a different composition.

The additional application of the second latex dispersion may for example be used for improving the grease resistance properties of the cellulose products 1. Laboratory tests have shown that if applying the second latex dispersion in the third application step following the application of the latex dispersion 4 in the second application step $S_{A2}$, suitable properties may be achieved, where the second latex dispersion has a composition with a styrene-acrylic emulsion, a vinyl-acrylic emulsion, or a vinyl-acetate emulsion. The second latex dispersion in the third application step is thus applied on top of the latex dispersion 4 in the second application step $S_{A2}$. The second latex dispersion may for example be applied in the third application step by spraying in a wet-on-wet application process directly after the application of the latex dispersion 4 in the second application step $S_{A2}$.

Thus, according to a further embodiment of the disclosure, the method for producing a cellulose product 1 from an air-formed cellulose blank structure 2 comprises the steps; providing an air-formed cellulose blank structure 2, wherein the cellulose blank structure 2 is air-formed from cellulose fibres; applying in a first application step $S_{A1}$ an AKD dispersion 3 to the cellulose blank structure 2, applying in a second application step $S_{A2}$ following the first application step $S_{A1}$ a latex dispersion 4 to the cellulose blank structure 2 with the applied AKD dispersion 3, and applying in a third application step following the second application step $S_{A2}$ a second latex dispersion to the cellulose blank structure 2 with the applied AKD dispersion 3 and latex dispersion 4; arranging the cellulose blank structure 2 with the applied AKD dispersion 3, latex dispersion 4, and the second latex dispersion, in a forming mould 5; heating the cellulose blank structure 2 with the applied AKD dispersion 3, latex dispersion 4, and second latex dispersion to a forming temperature $T_F$ in the range of 100° C. to 300° C.; and forming the cellulose product 1 from the cellulose blank structure 2 with the applied AKD dispersion 3, latex dispersion 4, and second latex dispersion, in the forming mould 5, by pressing the heated cellulose blank structure 2 with the applied AKD dispersion 3, latex dispersion 4, and second latex dispersion, with a forming pressure $P_F$ of at least 1 MPa, preferably 4-20 MPa.

In an embodiment, the second latex dispersion in the third application step has a composition of acrylate-based oligomer or polymer, where the acrylate-based oligomer or polymer is copolymerized or mixed with styrene and/or acrylonitrile; and 40-90% wt, preferably 60-90% wt, water. Laboratory tests have shown that with this described composition of the second latex dispersion in the third application step, a suitable protection for grease penetration into the cellulose fibres of the cellulose product 1 can be achieved, with a grease resistance KIT of 8 or greater according to the test method TAPPI T559 cm-12, Grease Resistance Test (KIT Test). The grease resistance can be further increased by curing the formed cellulose products 1 in a curing oven for approximately 10 seconds at a temperature of 150° C.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Cellulose product
2: Cellulose blank structure
2*a*: First surface, Cellulose blank structure
2*b*: Second surface, Cellulose blank structure
3: Alkyl ketene dimer (AKD) dispersion
4: Latex dispersion
5: Forming mould
5*a*: First mould part
5*b*: Second mould part
6: Roll
7*a*: First spray nozzle
7*b*: Second spray nozzle
8: Spray booth
9: Separation wall
10: Residual cellulose fibre structure

The invention claimed is:

1. A method for producing a cellulose product from an air-formed cellulose blank structure, wherein the method comprises the steps of providing an air-formed cellulose blank structure, wherein the cellulose blank structure is air-formed from cellulose fibres;

applying, in a first application step ($S_{A1}$), a dispersion consisting essentially of an alkyl ketene dimer (AKD) dispersion in a wet state to the cellulose blank structure with one or more first spray nozzles, wherein the amount of alkyl ketene dimer (AKD) compound in the range of 0.5-20 g/m$^2$;

applying, in a second application step ($S_{A2}$) directly following the first application step ($S_{A1}$), a latex dispersion in a wet state to the cellulose blank structure with one or more second spray nozzles with the applied alkyl ketene dimer (AKD) dispersion wherein the amount of latex compound is in the range of 0.5-20 g/m$^2$;

arranging the cellulose blank structure with the applied alkyl ketene dimer (AKD) dispersion and latex dispersion applied on top of the AKD dispersion in a forming mould, wherein the alkyl ketene dimer (AKD) dispersion and the latex dispersion are at least partly in a wet state prior to and/or during heating and forming the cellulose blank structure in the forming mould;

heating the cellulose blank structure with the applied alkyl ketene dimer (AKD) dispersion and latex dispersion to a forming temperature ($T_F$) in the range of 100° C. to 300° C., and forming the cellulose product from the cellulose blank structure with the applied alkyl ketene dimer (AKD) dispersion and latex dispersion in the forming mould, by pressing the heated cellulose blank structure with the applied alkyl ketene dimer (AKD) dispersion and latex dispersion with a forming pressure ($P_F$) of at least 1 MPa, wherein in the forming mould, water from the respective dispersions is evaporated and the formation of agglomerated AKD and latex compounds establishes an outer barrier structure on the formed cellulose product.

2. The method according to claim 1, wherein the alkyl ketene dimer (AKD) dispersion is in a wet state in the cellulose blank structure when applying the latex dispersion in the second application step ($S_{A2}$) to the cellulose blank structure with the applied alkyl ketene dimer (AKD) dispersion.

3. The method according to claim 1, wherein an amount of alkyl ketene dimer (AKD) compound applied to the cellulose blank structure is in the range of 0.5-15 $g/m^2$.

4. The method according to claim 1, wherein an amount of latex compound in the range of 0.5-15 $g/m^2$, is applied to the cellulose blank structure.

5. The method according to claim 1, wherein the cellulose product has a water absorptiveness value measured according to the test method ISO 535:2014 ($Cobb_{600}$ value) in the range 0-60 $g/m^2$.

6. The method of claim 5 wherein the formed cellulose product has a water absorptiveness value measured according to the test method ISO 535:2014 ($Cobb_{600}$ value) in the range 0-10 $g/m^2$ or 0-5 $g/m^2$.

7. The method according to claim 1, wherein the cellulose product has a water absorptiveness value measured according to the test method ISO 535:2014 ($Cobb_{600}$ value) in the range 0-30 $g/m^2$.

8. The method according to claim 1, wherein the forming pressure ($P_F$) is an isostatic forming pressure of at least 1 MPa.

9. The method according to claim 1, wherein the alkyl ketene dimer (AKD) dispersion has a composition of 3-25% wt alkyl ketene dimer (AKD) wax; 0-4% wt modified starch stabilizer or polymeric stabilizer and 75-97% wt water.

10. The method according to claim 1, wherein the latex dispersion has a composition of acrylate-based oligomer or polymer copolymerized or mixed with styrene and/or acrylonitrile; and 40-90% wt water.

11. The method according to claim 1, wherein before forming the cellulose product in the forming mould, the cellulose blank structure has a material composition of 98-99.98% dry wt cellulose fibres, 0.01-1% dry wt alkyl ketene dimer (AKD) compound, and 0.01-1% dry wt latex compound.

12. The method according to claim 1, wherein the combination of alkyl ketene dimer (AKD) dispersion in the first application step ($S_{A1}$) and latex dispersion in the second application step ($S_{A2}$) is applied on a first surface (2*a*) and/or a second surface (2*b*) of the cellulose blank structure.

13. A cellulose product produced according to the method in claim 1.

14. The cellulose product according to claim 13, wherein the cellulose product has a water absorptiveness value measured according to the test method ISO 535:2014 ($Cobb_{600}$ value) in the range 0-60 $g/m^2$.

15. The cellulose product of claim 13 wherein the cellulose product has a water absorptiveness value measured according to the test method ISO 535:2014 ($Cobb_{600}$ value) in the range 0-40 $g/m^2$ or 0-20 $g/m^2$.

16. The cellulose product of claim 13 wherein the cellulose product has a water absorptiveness value measured according to the test method ISO 535:2014 ($Cobb_{600}$ value) in the range 0-30 $g/m^2$, 0-10 $g/m^2$ or 0-5 $g/m^2$.

17. The method of claim 1 wherein the forming pressure is 4-20 MPa.

18. The method of claim 1 wherein the amount of alkyl ketene dimer (AKD) compound applied to the cellulose blank structure is in the range of 0.5-4 $g/m^2$.

19. The method of claim 1 wherein the amount of latex compound is in the range of 0.5-4 $g/m^2$.

20. The method of claim 1 wherein the formed cellulose product has a water absorptiveness value measured according to the test method ISO 535:2014 ($Cobb_{600}$ value) in the range 0-40 $g/m^2$ or 0-20 $g/m^2$.

21. The method of claim 1 wherein the forming pressure ($P_F$) is an isostatic forming pressure of 4-20 MPa.

22. The method of claim 1 wherein the latex dispersion has a composition of acrylate-based oligomer or polymer, wherein the acrylate-based oligomer or polymer is copolymerized or mixed with styrene and/or acrylonitrile; and 60-90% wt, water.

* * * * *